US011326996B2

(12) United States Patent
Wells et al.

(10) Patent No.: US 11,326,996 B2
(45) Date of Patent: May 10, 2022

(54) SYSTEM FOR MONITORING AND DISPLAYING STATUS OF PROCESSING OF A FLUID

(71) Applicant: TZero Research & Development LLC, State College, PA (US)

(72) Inventors: Stephen M. Wells, State College, PA (US); Nicholas A. Wells, State College, PA (US); Eli M. Hughes, State College, PA (US)

(73) Assignee: TZero Research & Development LLC, State College, PA (US)

( * ) Notice: Subject to any disclaimer, the term of this patent is extended or adjusted under 35 U.S.C. 154(b) by 200 days.

(21) Appl. No.: 16/810,943

(22) Filed: Mar. 6, 2020

(65) Prior Publication Data

US 2020/0292434 A1     Sep. 17, 2020

Related U.S. Application Data

(60) Provisional application No. 62/818,926, filed on Mar. 15, 2019.

(51) Int. Cl.
*G01N 9/24*        (2006.01)
*G01N 29/024*      (2006.01)
(Continued)

(52) U.S. Cl.
CPC ............... *G01N 9/24* (2013.01); *G01F 1/668* (2013.01); *G01F 1/74* (2013.01); *G01F 15/024* (2013.01);
(Continued)

(58) Field of Classification Search
CPC ...... G01N 9/24; G01N 29/024; G01N 29/343; G01N 2291/02818; G01N 2291/02836;
(Continued)

(56) References Cited

U.S. PATENT DOCUMENTS 2,283,750 A    5/1942  Mikelson
4,119,950 A   10/1978  Redding
(Continued)

OTHER PUBLICATIONS

U.S. Appl. No. 16/810,938, filed Mar. 6, 2020, System With Sonic Sensor for Detection and Monitoring of Fluid Processing Characteristics.
Information about Related Patent and Patent Applications, see section 6 of the accompanying Information Disclosure Statement Letter, which concerns Related Patents and Patent Applications.

*Primary Examiner* — Peter J Macchiarolo
*Assistant Examiner* — John M Royston
(74) *Attorney, Agent, or Firm* — Fox Rothschild LLP

(57) ABSTRACT

A system for monitoring processing of a fluid receives one or more characteristics of the fluid and uses those characteristics to determine specific gravity of the fluid and a level of processing activity of the fluid. The processor will cause a display device to output a dynamic representation of the specific gravity of the fluid as well as the determined level of processing activity. In some embodiments, the processing activity may include fermentation, as that of a beverage. If so, the dynamic representation of the determined level of processing activity may include a fermentation tank with a dynamically changing cavity. Displayed characteristics of the cavity will change as the determined level of the fermentation increases.

44 Claims, 9 Drawing Sheets

(51) Int. Cl.
*G01F 1/74* (2006.01)
*G01F 15/02* (2006.01)
*G01F 1/66* (2006.01)
*G01N 29/24* (2006.01)
*G01N 29/34* (2006.01)
*G01F 1/667* (2022.01)

(52) U.S. Cl.
CPC ........... *G01N 29/024* (2013.01); *G01N 29/24* (2013.01); *G01N 29/343* (2013.01); *G01N 2291/02818* (2013.01); *G01N 2291/02836* (2013.01)

(58) Field of Classification Search
CPC ......... G01N 29/2437; G01N 2291/022; G01N 29/326
See application file for complete search history.

(56) References Cited

U.S. PATENT DOCUMENTS

| | | | |
|---|---|---|---|
| 4,380,167 A | | 4/1983 | Longini |
| 4,663,977 A | | 5/1987 | Vander Heyden |
| 4,763,513 A | * | 8/1988 | Zacharias ............... G01F 1/662 |
| | | | 310/327 |
| 4,959,228 A | | 9/1990 | Skrgatic et al. |
| 6,640,626 B2 | | 11/2003 | Saikalis et al. |
| 2016/0252440 A1 | * | 9/2016 | Wright .................... G01N 9/02 |
| | | | 73/32 R |
| 2016/0326866 A1 | * | 11/2016 | Swett .................... B06B 1/0614 |
| 2018/0072972 A1 | * | 3/2018 | Shin .................... B67D 1/0888 |

* cited by examiner

SYSTEM FOR MONITORING AND DISPLAYING STATUS OF PROCESSING OF A FLUID

RELATED APPLICATIONS AND CLAIM OF PRIORITY

This patent document claims priority to U.S. Provisional Patent Application No. 62/818,926, filed Mar. 15, 2019, the disclosure of which is fully incorporated into this document by reference.

BACKGROUND

The measurement of fluid characteristics in static and dynamic environments is important in many industrial processes. For example, when brewing beer or making another fermented beverage, it is desirable to monitor the processing activity to ensure that it is progressing at an expected rate. If fermentation is too quick or too slow, the resulting product may exhibit poor quality and may need to be discarded.

Characteristics such as the density, compressibility and acoustic impedance of a fluid may contain important information to indicate the status of fluid processing activity such as a beverage fermentation process. Of particular interest in many applications is the determination of fluid density. Typically, to make a density measurement of a fluid, an accurate volumetric measurement or removal of the fluid is required. However, for rapid or remote monitoring and particularly in dynamic situations, a simplified approach is desired. Furthermore, a system that can constantly measure these fluid characteristics without requiring interruption or fluid removal is desired.

Obtaining a measurement of a density of a fluid has numerous advantages for various industrial applications, one of which is the alcoholic fermentation of beer. The alcoholic fermentation induced by the presence of yeasts is a fundamental step in several biotechnological processes, including the production of beer. Obtaining density measurements of beer is beneficial as an indicator for determining whether the beer is properly fermented. For industrial purposes, the exact prediction of the fluid density during the fermentation process as early as possible would be of great value. This is especially useful during the fermentation of beer, considering the fact that the fermentation binds a huge amount of machine capacities and time. Possessing an appropriate process status predictor, preceding and subsequent steps could be coordinated better to maximize resource utilization and minimize overall costs.

Simple ultrasonic techniques have been already proposed as a method to determine the density of beer during the fermentation process. Ultrasonic methods provide a non-invasive and non-destructive system to monitor the fermentation process. The non-invasive aspect of ultrasonic methods is of particular importance for biotechnological or medical purposes, where hygienic or microbiological safety must be guaranteed. Ultrasonic devices have been developed which are capable of providing some information concerning fluids. For example, devices using ultrasonic signals to determine the fluid level in containers are disclosed in U.S. Pat. Nos. 3,357,246, 4,144,517 and 4,203,324. However, these devices have limited accuracy in certain processes such as fermentation and other biotechnological processes in which the fluid properties are constantly changing and require additional measurements to assist in the determination of fluid characteristics in real-time.

Accordingly, there exists a need for an easy-to-deploy, low-maintenance, high-sensitivity sensor device capable of autonomously, quickly and reliably measuring fluid characteristics in real-time. This document describes a system that solves at least some of the problems described above.

SUMMARY

In various embodiments, a system for detecting one or more characteristics of a fluid includes a sonic sensor. The sonic sensor includes a transducer, a transduction surface, and an acoustically reflective pad member. The transducer may be contained within a probe body, and the transduction surface may be an element of the probe body. An optional stem may have one end that connects to the acoustically reflective pad member and a second end that connects to the transduction surface.

In at least some embodiments, the stem may include a metallic shell having an inner cavity that is filled with an epoxy. In at least some embodiments, the acoustically reflective pad member comprises a metallic pad surface having a face that is positioned to face the transduction surface of the probe body and that is positioned to be parallel with the transduction surface.

In at least some embodiments, the system may include a processor and a memory containing programming instructions that are configured to cause the processor to: (i) generate a signal that will cause the transducer to generate a set of pulses that will be transmitted to the pad member via a fluid when the transduction surface and pad member are immersed in the fluid, and (ii) receive, from the transducer, signals indicating when reflected pulses have been received from the pad member. For at least some of the pulses in the set of pulses, the processor may determine a time of generation, and a time at which a corresponding reflected pulse is received at the transduction surface. The processor may use the determined times and a length of the stem (if present), or a distance between the transduction surface and the acoustically reflective pad member, to determine a speed of sound in a fluid that is in contact with the pad member, stem and transduction surface.

In some embodiments, the processor may use the speed of sound in the fluid to determine density, specific gravity or stiffness of the fluid. If the system uses the speed of sound in the fluid to determine a specific gravity of the fluid, it may also use the specific gravity to assess fermentation activity of the fluid or API gravity of the fluid.

The system also may cause a display device to output a graphic representation of the determined characteristics, such as density, specific gravity, API gravity, stiffness or fermentation activity. In various embodiments, the processor may include an onboard processor that is positioned within the probe body and electronically connected to the transducer and/or an offboard processor that is an element of a computing device that is communicatively connected to the sonic sensor.

In various embodiments, a system for monitoring processing of a fluid includes a sensor and a memory containing programming instructions that are configured to cause a processor to use the one or more characteristics of the fluid to determine specific gravity of the fluid and a level of processing activity of the fluid. The processor will cause a display device to output a dynamic representation of the specific gravity of the fluid, as determined by the processing device based on the one or more characteristics. The processor also will cause a display device to output determined level of processing activity as determined by the processing device based on the one or more characteristics.

In some embodiments, the processing activity may include fermentation, as that of a beverage. If so, the dynamic representation of the determined level of processing activity may include a fermentation tank with a dynamically changing cavity. Displayed characteristics of the cavity will change as the determined level of the fermentation increases.

In some embodiments, the system may use the determined level of fermentation to identify a remaining time for completion of fermentation of the fluid. If so, the processor may cause the display device to output a dynamic representation of the remaining time for completion of the fermentation of the fluid. In addition or alternatively, the dynamic representation of the determined level of processing activity may include a dynamically changing status bar. The status bar may include a segment representing a processing activity level and a segment representing a period during which the fluid may remain in a tank in which the sensor is present after processing is complete.

In some embodiments, the system may continue to determine the level of processing activity of the fluid over a period of time. If so, it may access a data set of previous processing activity for the fluid and identify, from the data set, an expected level of processing activity over the period of time. The system may assess whether the determined level of processing activity over the period of time deviates from the expected level of processing activity over the period of time. When the determined level of processing activity over the period of time deviates from the expected level of processing activity over the period of time, the system may cause the display device to generate an output indicating such.

In some embodiments, the sensor may include a sonic sensor. The one or more characteristics of the fluid comprise a speed of sound within the fluid. Using the one or more characteristics of the fluid to determine the specific gravity of the fluid may include using the speed of sound and a bulk modulus of the fluid to determine the specific gravity of the fluid. Using the one or more characteristics of the fluid to determine a level of processing activity of the fluid comprises identifying changes in the specific gravity of the fluid over a period of time and using the changes to determine the level of processing activity. The system may include a transducer, a processor, and programming instructions that are configured to cause the processor to: cause the transducer to generate and transmit signals toward a reflective surface; monitor signals reflected from the reflective surface when received by the transducer; and use a time of generation of the generated signals and a time of receipt the received signals to measure the speed of sound in the fluid.

In various embodiments, to determine specific gravity of the fluid the system may use the speed of sound to determine a density of the fluid, and it may determine the specific gravity of the fluid as a ratio of the density of the fluid to a constant that is specific density of water.

In some embodiments, the sensor may include a sonic sensor, and the one or more characteristics of the fluid comprise a speed of sound within the fluid. If so, to determine the specific gravity of the fluid the system may use the speed of sound of the fluid and a bulk modulus to determine density of the fluid, and then determine the specific gravity of the fluid based on the density. The system also may use the specific gravity to determine API gravity of the fluid. If so, then the system may cause the display device to display the determined API gravity of the fluid.

In other embodiments, a system for monitoring processing of a fluid may include a sonic sensor for measuring speed of sound in a fluid when the fluid in contact with the sensor. The system also may include a memory containing programming instructions that are configured to cause a processing device to use the speed of sound of the fluid and a bulk modulus for the fluid to determine density of the fluid. The system may use the density to determine the specific gravity of the fluid. The system may then use the determined specific gravity to determine a level of processing activity of the fluid by identifying changes in the specific gravity of the fluid over a period of time and using the changes to determine the level of processing activity. The system may cause a display device to output a dynamic representation of the determined level of processing activity as determined by the processing device.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure are defined at the end of this Detailed Description section.

Figure 1:
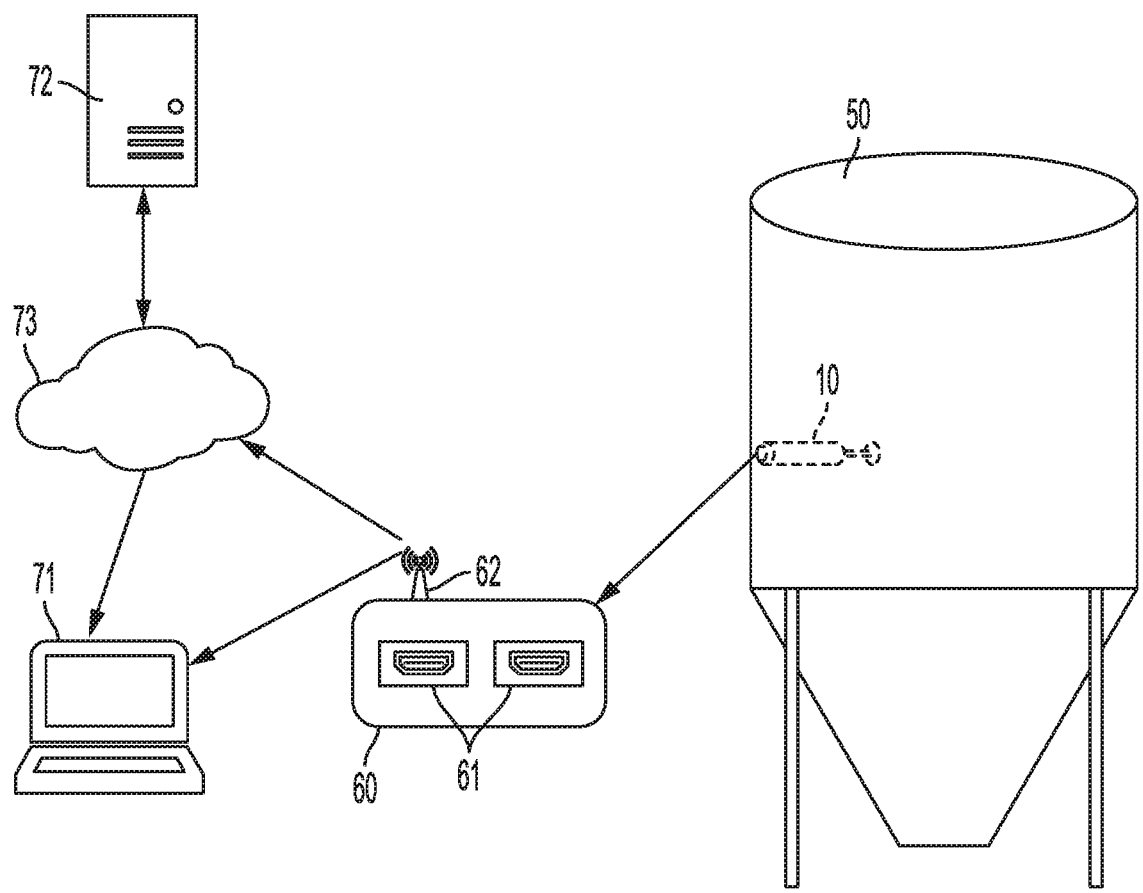
FIG. 1 illustrates elements of an example system for measuring characteristics of fluid that is being processed.

FIG. 1 illustrates elements of an example system for measuring characteristics of a liquid or other fluid that is being processed. The system is used with a fluid processing container 50, which in this illustration is a fermentation tank such as that used in a beer, cider or other beverage fermentation process. Other fluid processing containers may be used for other fluid processing activities, such as biological fluid processing systems, chemical manufacturing processes, milk production tanks, vats for producing food products such as soups, sauces or meat substitutes, flavoring and/or fragrance production equipment, and natural gas or oil processing systems. The system includes a sonic sensor 10 that can be installed inside of the container and which includes a fitting that connects to or is outside of the container when the sensor is in place. The fitting may include or be electrically connected to a transmitter that transmits signals to a communication gateway 60, or the fitting may pass a wire that is used to transmit signals to the communication gateway 60. The gateway 60 includes one or more ports 61 or receivers that receive signals from the sonic sensor 10 and: (i) relay the signals via a transmitter 62 to a remote server 72 via a communication network 73; and/or (ii) relay the signals to a local computer 71 via the transmitter 62, either directly or through the communication network 73. The gateway 60 is optional, as the computer 71 may be directly connected to the sonic sensor 10, and if the sonic sensor 10 is equipped with a transmitter then the sonic sensor 10 may transmit signals to the computer 71 and/or remote server 72 either directly or via a communication network 73.

Figure 2:
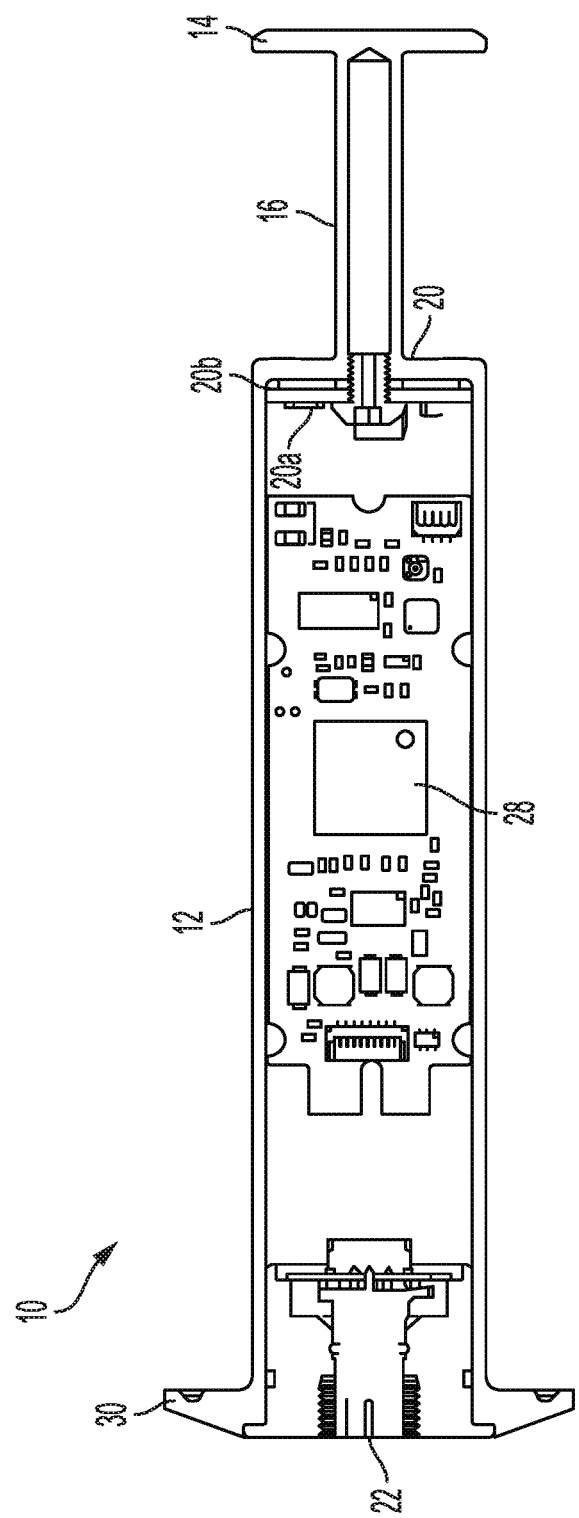
FIG. 2 is a cross-sectional view of elements of a sonic sensor that may be used with the system of FIG. 1.

FIG. 2 illustrates a cut-away view of a sonic sensor 10 in accordance with various embodiments. Sonic sensor 10 includes a probe body 12, which may include a housing having a first end that is connected to a fitting 30. The probe body 12 housing may be cylindrical, or shaped in another form such as a rectangular or conical shape, and formed of any appropriate conductive material providing a hygienic or microbiological safe surface such as American Iron and Steel Institute (AISI) Type 304 or 316 stainless steel. The fitting 30 may be designed to provide a portal via which the probe may be inserted into a fluid processing tank and via which signals captured by the probe may be transmitted out of the tank, either via a wire or via a wireless transmitter. In various embodiments, the fitting 30 may be of a universal sanitary fitting type, such as a Tri-Clamp type fitting having a 1 inch or 1.5 inch outside diameter which may fit into standard openings of fermentation vessels, a DIN fitting for use with dairy production equipment, or another fitting that is suitable for creating a sanitary seal with the container. However, it is to be understood that the fitting 30 is not limited to any particular shape, size or type, and it and may be any appropriate design that can be retrofit and/or provide a new installation into a fluid container. In addition, if the fluid container is configured to hold the sonic sensor 10 so that its reflective pad member 14 floats freely within the fluid, or of a device is available to hold the sonic sensor 10 in such a position, a fitting 30 may not be required.

A second end of the probe body 12 includes transduction surface 26 for signals received from an acoustically reflective pad member 14. The transduction surface 26 may be a closed end cap of the probe body 12, or it may be a member that is positioned proximate to and just inside or outside of the end cap. The transduction surface 26 may be a flat circle, rectangle, oval, square, or other shape. The reflective pad member 14 also may be a flat circle, rectangle, oval, square, or other shape, and it may or may not be the same shape as the transduction surface 26. Optionally the reflective pad member 14 may a surface area that is at least as large as that of the transduction surface 26 so that acoustic signals transmitted from the transduction surface 26 will reflect off of the reflective pad member 14. The reflective pad member 14 may be made of a metal such as stainless steel and is connected to the probe body 12 through a stem 16, as the stem 16 includes a first end that is connected to the reflective pad member 14 and a second end that is connected to the transduction surface 26. When the reflective pad member 14, stem 16, and transduction surface 26 are immersed in the fluid, electric components in the probe body may generate an ultrasonic pulse that will enter the fluid from the transduction surface 26 and reflect back from the pad member 14. These signals can be used to measure the speed of sound through the fluid. The reflective pad member 14 may include a substantially flat surface that is positioned substantially parallel to the transduction surface 26 and perpendicular to the longest dimension of the stem 16, and thus substantially perpendicular to the direction of propagation of the ultrasonic signal.

The stem 16 connects to the transduction surface 26, which is electrically connected to a transducer 15, such as a piezoelectric transducer, that will convert the ultrasonic signal to an electrical signal. The stem 16 may be a heavily damped connector that includes a metallic housing (such as a stainless steel shell) that is filled with a damping material to reduce noise in the signal that it transfers from the reflective pad member 14 to the transduction surface 26. The damping material may be an epoxy, rubber, cork, or other material that provides damping to the metallic housing. The stem 16 may thus serve as a vibroacoustically absorptive connector.

Optionally, in some embodiments the vibroacoustically absorptive stem 16 may be omitted if the reflective pad member 14 is positioned and secured within the fluid, held in place by a support structure. If so, the reflective pad member 14 will be positioned at a known distance from the transduction surface 26, and also so that the surface of the reflective pad member 14 is parallel to the transduction surface 26.

Optionally, the probe body 12, stem 16 and reflective pad member 14 may be formed of a single piece of metal, machined to create a relatively narrow bore inside of the stem 16 and a relatively larger bore inside of the probe body 12. This manufacturing process, if used, will not require any welds or other connective structures to join the probe body 12, stem 16 and reflective pad member 14.

The transduction surface 26 also may be electrically connected to a temperature sensor 17 so that the temperature sensor 17 can detect the temperature of the transduction surface 26, which will be substantially the same as the temperature of the interconnected stem 16 and pad member 14, and thus indicative of the temperature of the fluid which contacts the stem 16 and pad member 14. The temperature sensor 17 and transducer 15 may be positioned on one or more circuit boards 20 adhered to or proximate to the transduction surface 26.

The outputs of the temperature sensor 17 and transducer 15 are electrically connected to an onboard processor 28.

The processor 28 may be a microprocessor that will execute programming instructions stored on a memory 29, or it may be an element of a microcontroller that includes a memory with programming instructions. The processor 28 will receive the signals from the temperature sensor 17 and transducer 15 and use those signals to determine various properties of the fluid, such as density, specific gravity or other characteristics.

When executing the programming instructions, the processor will cause the transducer 15 to generate a set of pulses that will travel from the transduction surface 26 through the surrounding fluid to the reflective pad member 14. The transducer 15 will be acoustically connected to the transduction surface 26, either through direct connection or one or more intermediate structures, so that sonic pulses output by the transducer 16 will travel through the transduction surface 26. The stem 16 will have a known length that the processor will use to measure the time is takes for each ultrasonic pulse to leave the transduction surface 26 and return after reflecting off the reflective pad 14. The system can use this "time-of-flight" of the ultrasonic pulse to determine the ultrasonic sound speed, which it may use as a proxy to determine one or more characteristics of the fluid that is in contact with the reflective pad 14.

By way of example, the density ($\rho$) of a fluid is related to the ultrasonic sound speed (c) and the compressibility of the fluid as represented by a bulk modulus ($\beta$) according to the following equation:

$$c = \sqrt{\frac{\beta}{\rho}}$$

If the system receives as an input or stores a value of the compressibility ($\beta$) of the fluid, the system may use this equation to determine the fluid's density ($\rho$) at any point in time based on the ultrasonic sound speed (c) at that time. In such applications, the sonic sensor 10 may be considered to be a sonic density sensor.

The processor may transfer the measured data via a communication port 22 to an external processor (such as that of the computer 71 in FIG. 1) for supplemental processing and data visualization. The communication port 22 shown is a High-Definition Multimedia Interface (HDMI) port, but any connection for communicating measurements to an outboard analysis unit may be used.

In some alternative embodiments, instead of determining the fluid characteristics onboard the sonic sensor 10, the sonic sensor 10 may simply transfer the data received from the temperature sensor 17 and transducer 15 to an off-board computing device to perform the fluid characteristic determination outside of the sensor 10.

Figure 3:
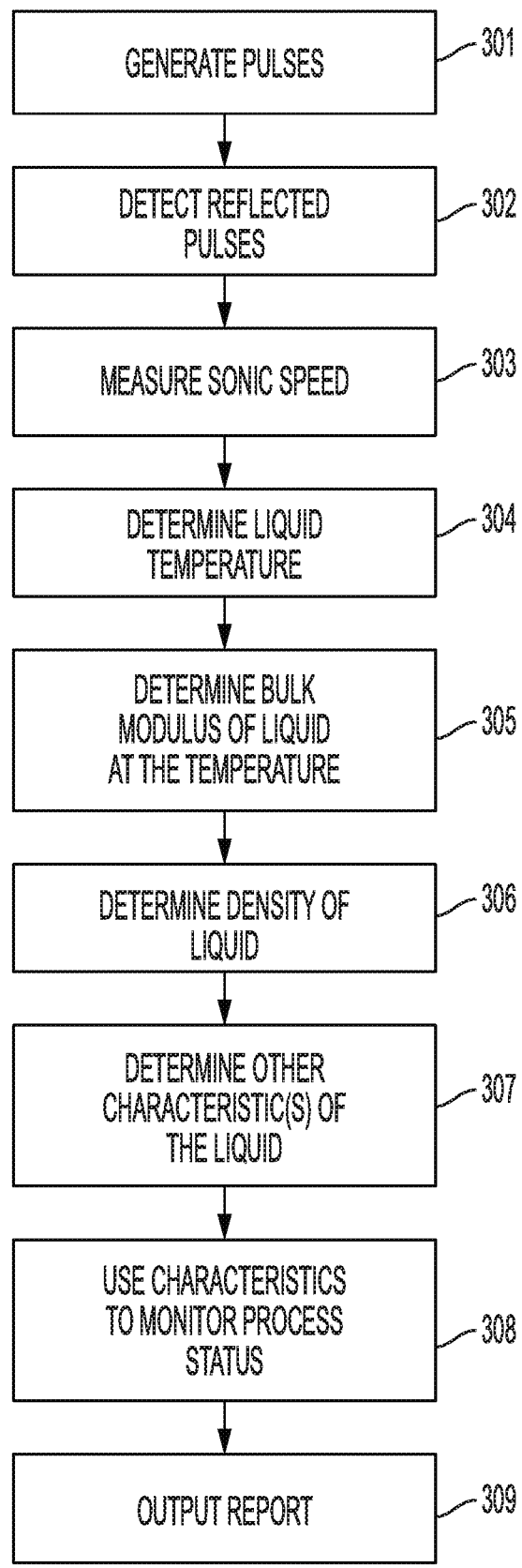
FIG. 3 is a flowchart illustrating an example process of determining fluid characteristics using a sonic sensor such as that of FIG. 2.

FIG. 3 illustrates an example method of determining fluid characteristics in a beverage fermentation process, such as may be used in brewing beer, cider, wine, rice wine (such as sake), mead, kombucha, root beer, ginger beer. A system such as that described above will use a sonic sensor such as that described in FIG. 2 to generate sonic pulses (at 301) and transmit the pulses to a reflective pad member that is placed in the fluid. The sensor will then detect reflected pulses (at 302) and determine the sound speed within the fluid (at 303). The speed of sound may simply be determined be a process such as (i) determining the time of travel of each pulse, as measured from the time of generation to the time at which the transducer receives the reflected pulse, and (ii) dividing the time of travel by the distance of travel (which is twice the length of the stem, which is also the distance between the reflective pad and the transduction surface). In practice this equation may be modified by a factor that is a function of the fluid type, stem thickness, temperature or other variables.

At 306 the system may then use the determined speed of sound (c) to determine a density ($\rho$) of the fluid. The system may do this using the equation described above, using a bulk modulus ($\beta$) in which:

$$\rho = \frac{\beta}{c^2}$$

The system will need to identify the bulk modulus ($\beta$) at 305 before completing this calculation. The system may receive the bulk modulus as a user input via the user interface, or it may store the bulk modulus as a characteristic of the fluid in a data set. In general, the bulk modulus ($\beta$) of a fluid is a thermodynamic property that may vary by temperature, and thus the system also may need to identify the temperature of the fluid (as detected by the temperature sensor) at 304 before determining the particular bulk modulus for the temperature. Once the system receives the temperature (at 304) and an identification of the fluid, it may determine the bulk modulus (at 305) by a suitable calculation, or by retrieving the bulk modulus from a data set stored in memory.

At 307 the system may then use the density to determine one or more other characteristics of the fluid. For example, the specific gravity of a substance is a ratio of the density of the substance to the density of a reference substance, such as water (which has a density of 1 gram/cubic centimeter). The system may thus use the density to determine the fluid's specific gravity. If the fluid is oil or a petroleum product, the system may determine specific gravity of the fluid and then convert that measurement to API gravity, where API=(141.5/SG)−131.5, where SG is the specific gravity.

At 308 the system may use the determined characteristics to assess and/or monitor the progress of the process and determine when the process is complete. For example, in fermentation and distillation processes, specific gravity can be used to monitor the process of the fermentation or distillation. When a target specific gravity is achieved, or when a rate of change of the specific gravity decreases and the specific gravity remains relatively constant (i.e., below a threshold standard deviation) for a threshold period of time, the process may be considered to be complete. For example, when brewing beer, the process may be considered to be complete when the specific gravity has dropped by 70 or 75% of its original level, or when the specific gravity remains substantially constant for a period of three days. Other levels and time frames may be used depending on the process and desired result.

Figure 5:
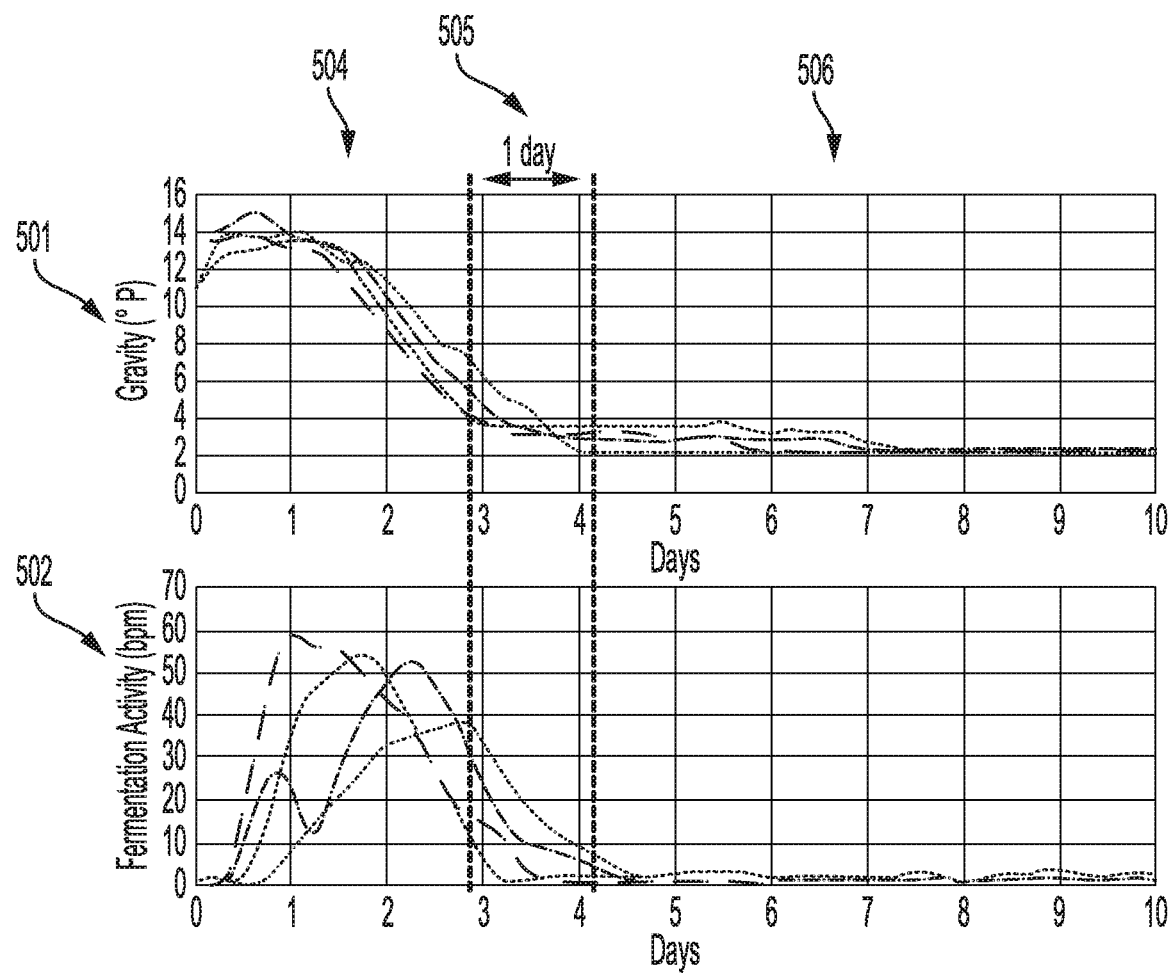
FIG. 5 illustrates an example data set showing use of the system and methods described below in a beer brewing process.

This is illustrated in FIG. 5, which shows results of an example case study with gravity measurements over time 501 of various batches of beer in a brewing facility. Each line in the graph representing a batch. During the first few days of fermentation 504, the fluid's specific gravity remains relatively high, until a day (at 505) during which the gravity experiences a significant drop. Gravity then then levels off afterward at 506 at a relatively stable lower value. The gravity measurements over time 501 correspond fairly well to the fermentation levels over time 502. Gravity or density measurements alone may be used as a proxy for fermentation level, or the system may calculate a fermentation level using a function of gravity or density levels and other factors, such as elapsed time, temperature, or other factors.

Returning to FIG. 3, at any point in the process, at 309 the system may output any of the measured parameters (such as temperature or speed of sound), calculated characteristics (such as density or specific gravity), or indication of progress of the process (such as fermentation activity). The output may occur by an electronic message, via an audio output, or via a user interface. Examples of user interfaces will be discussed below in the context of FIGS. 4A-4C.

The methods described above may be used in other fluid processing activities in which measurements such as that of the fluid's specific gravity or density are useful to monitor progress of the process. Examples of such other processes include alcoholic beverage distillation, hydrocarbon product processing (such as crude oil and petroleum products, in which the system may determine API gravity), ingestible probiotic production and the manufacture of pharmaceuticals. In some such processes, the fluid's density may remain constant but other variables (such as stiffness) of the fluid may change. The system may look for changes in the values of those variables and use those changes (in view of the equations above) as indicia of a level of processing activity (or at least a change in condition) of the fluid.

Figure 4A:
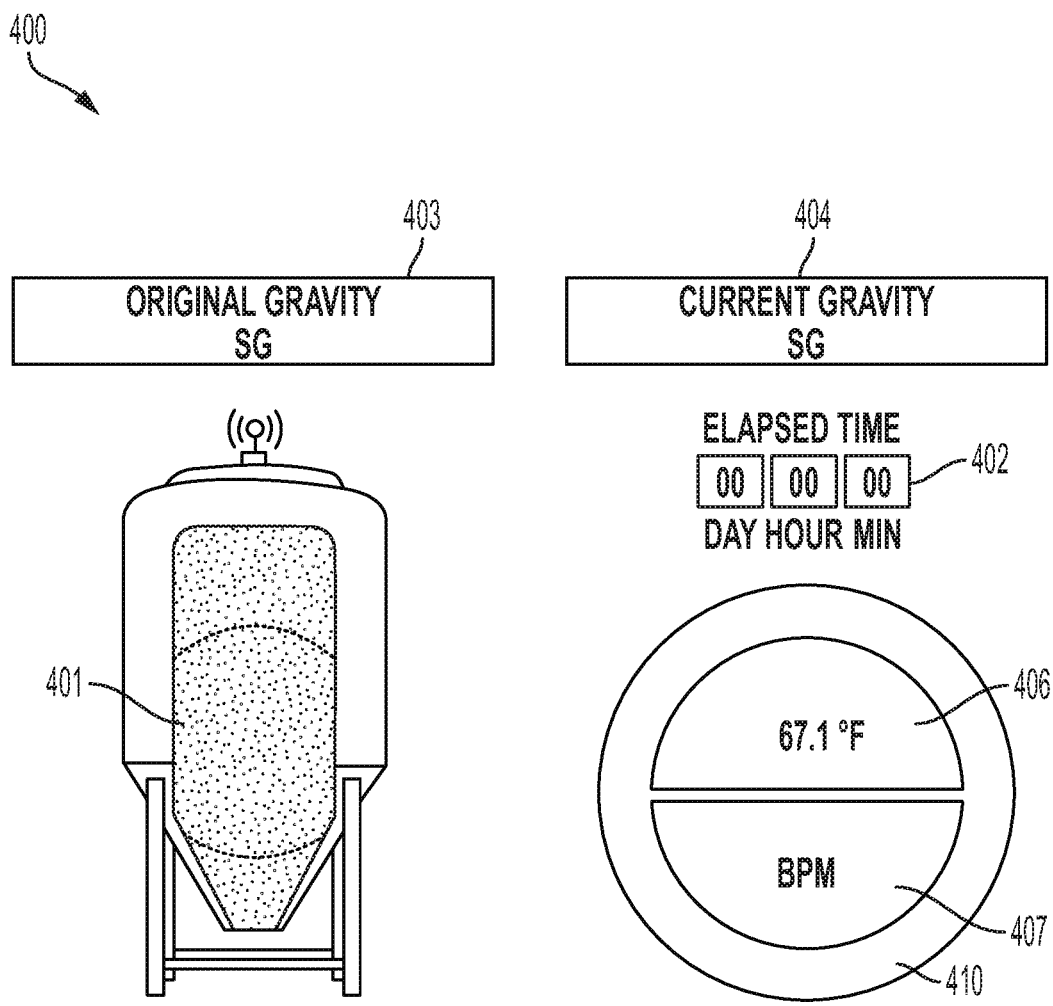
FIGS. 4A-4C illustrate elements of a user interface for displaying progress of beverage fermentation or other processing of a fluid.
Figure 4B:
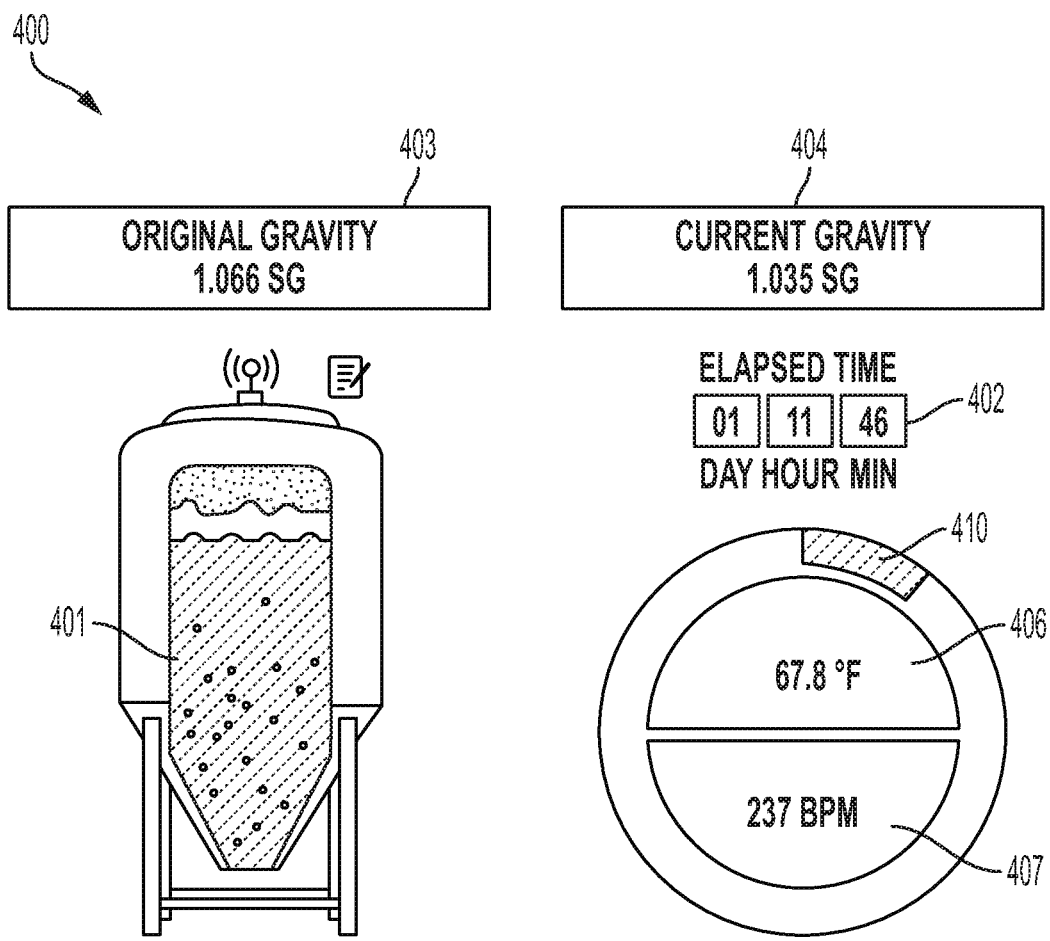
Figure 4C:
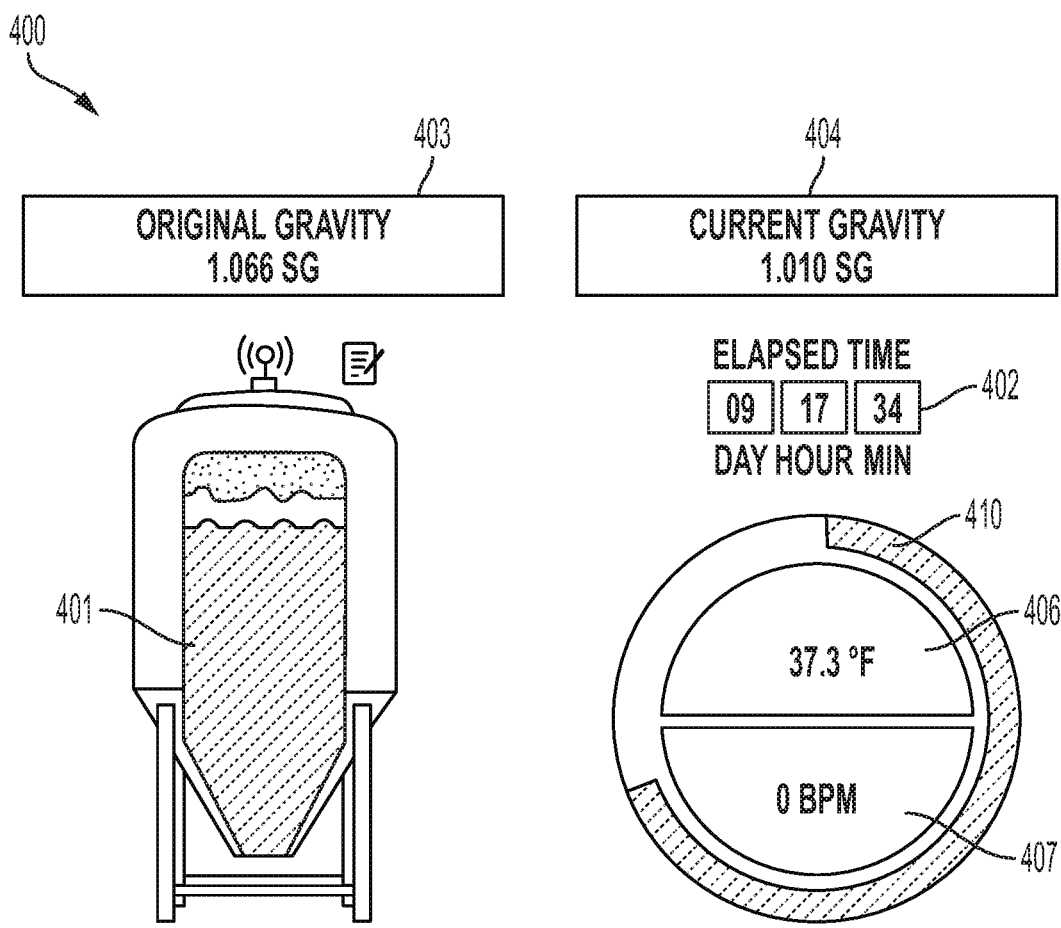

FIGS. 4A-4C illustrate an example user interface 400 for monitoring processing of a fluid, such as fermentation of a beverage which is shown in this example. The user interface presents information received from the sonic sensor and/or determined by a processor, and it also include a dynamic representation of the determined level of fermentation (or other process progress). In this case the dynamic representation includes a visual representation of a fermentation tank 401 with a dynamically changing cavity, as well as a status bar 410 that is in the form of a circle.

The user interface also includes a dynamically changing time field 402 that indicates either (a) how much time has elapsed in the process, or (b) how much time is expected to remain in the process. If expected time remaining is use, the system may determine this by subtracting elapsed time from an expected time that is stored in a memory based on previous processing times for batches of the same or a similar product. Optionally, the system may dynamically adjust the expected time to remain if processing parameters indicate that at one or more points in time the fluid's gravity is more than a threshold level above or below an expected value or range based on target data from previous batches as stored in memory.

The user interface also displays characteristics of the fluid such as original specific gravity 403 or original extract as measured at a reference time at or near the beginning of the process, the current specific gravity 404 as measured in real time, the temperature 406 of the fluid and other measurements or calculated parameters 407. In this example the other calculated parameter 407 is bubbles per minute, which is a value that represents or is a function of the rate of fermentation activity and the transformation of sugar to $CO_2$ and alcohol generation and the resulting change of the gravity at any given point in time.

Before the process starts, FIG. 4A illustrates the tank 401 with an empty cavity, and the status bar 410 contains no shading. The original specific gravity 403 has not yet been determined, and no time 402 has elapsed.

FIG. 4B shows that after a time 402 of nearly 1.5 days, the original gravity 403 has been identified, and the current gravity 404, temperature 406 and other parameters 407 (in this case bubbles per minute) are displayed. The dynamic representation's tank 401 shows that characteristics of the cavity have changed to show beer in the tank with bubbles indicating that the fermentation process is active. The dynamic representation's status bar 410 shows shading around a portion of the circle, indicating that fermentation has started but is not yet even 25% complete.

FIG. 4C shows that after a time 402 of nearly 10 days, the original gravity 403, current gravity 404, temperature 406 and other parameters 407 (in this case bubbles per minute) continue to be displayed. Both the current gravity 404 and the temperature 406 of the tank have dropped as compared to that shown in FIG. 4B. Because the gravity has dropped and reached a substantially stable level, the dynamic representation's tank 401 shows new characteristics—in this case bubbles no longer appear—indicating that the fermentation process has slowed or competed. The dynamic representation's status bar 410 shows shading around approximately ¾ of circle, indicating that even though the fermentation process is complete the beer may remain in the tank for a period of time while the temperature is reduced to near freezing to clear the remaining yeast and other particulates, as depicted by the temperature 406 in FIG. 4C.

In some embodiments, the user interface may include graphic outputs to help indicate whether a fermentation or other process is deviating from expected norms. For example, FIGS. 5A and 5B illustrate gravity 501 and calculated fermentation activity 502 levels over time for several batches of a beer. Optionally, the system may include a user interface field that displays such results in graphic form such as that shown. In the examples of FIGS. 5A and 5B, the lines are fairly close together, which establishes a knowledge base that can be used to establish a normal range of gravity and fermentation level that would be expected at any particular point in elapsed time for the particular recipe.

Figure 6:
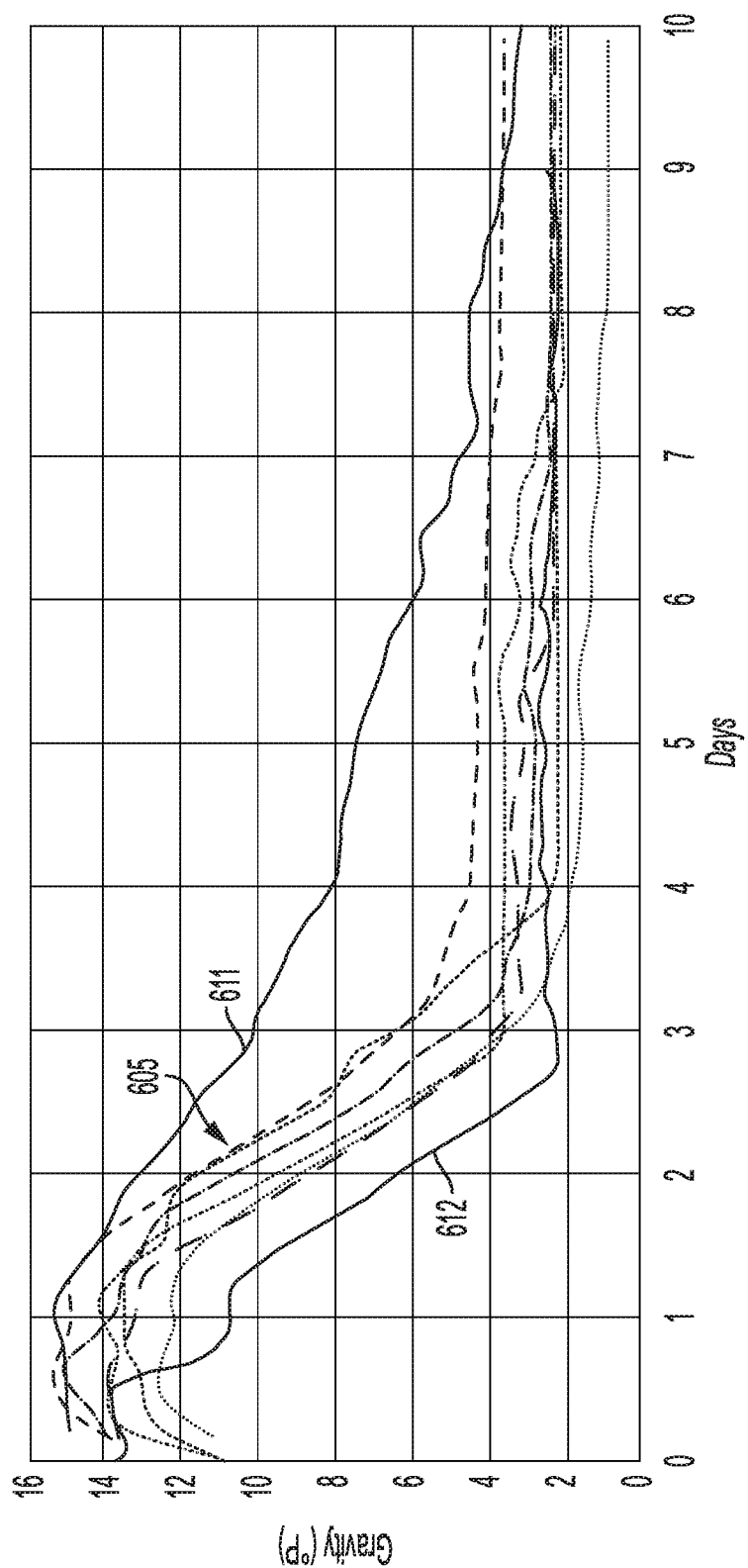
FIG. 6 illustrates how the data set may be used to graphically indicate processing activity that deviates from expected norms.

Deviations from these expected norms can use the resulting product to have a poor quality. For example, FIG. 6 illustrates of data from several batches of beer in which batches collectively designated by 605 (shown as dashed lines) are within expected norms, but batches 611 and 612 (shown as solid lines) deviate from the expected norms by more than a threshold (such as a threshold standard deviation level). In batch 611, gravity is not dropping as quickly as expected, and thus fermentation is occurring more slowly than expected. The brewer may adjust for this by increasing the temperature, adding more yeast, or taking other action to try to speed the fermentation process. In contrast, in batch 612 the gravity is dropping and fermentation is occurring more quickly than expected. The brewer may attempt to slow fermentation by adding malt, reducing the temperature, or taking other action to try to slow the fermentation process. In either case, if the process is deviating from expected norms, the system may illustrate it graphically as shown, or it may simply display an alarm message alerting the processor to take action.

Figure 7:
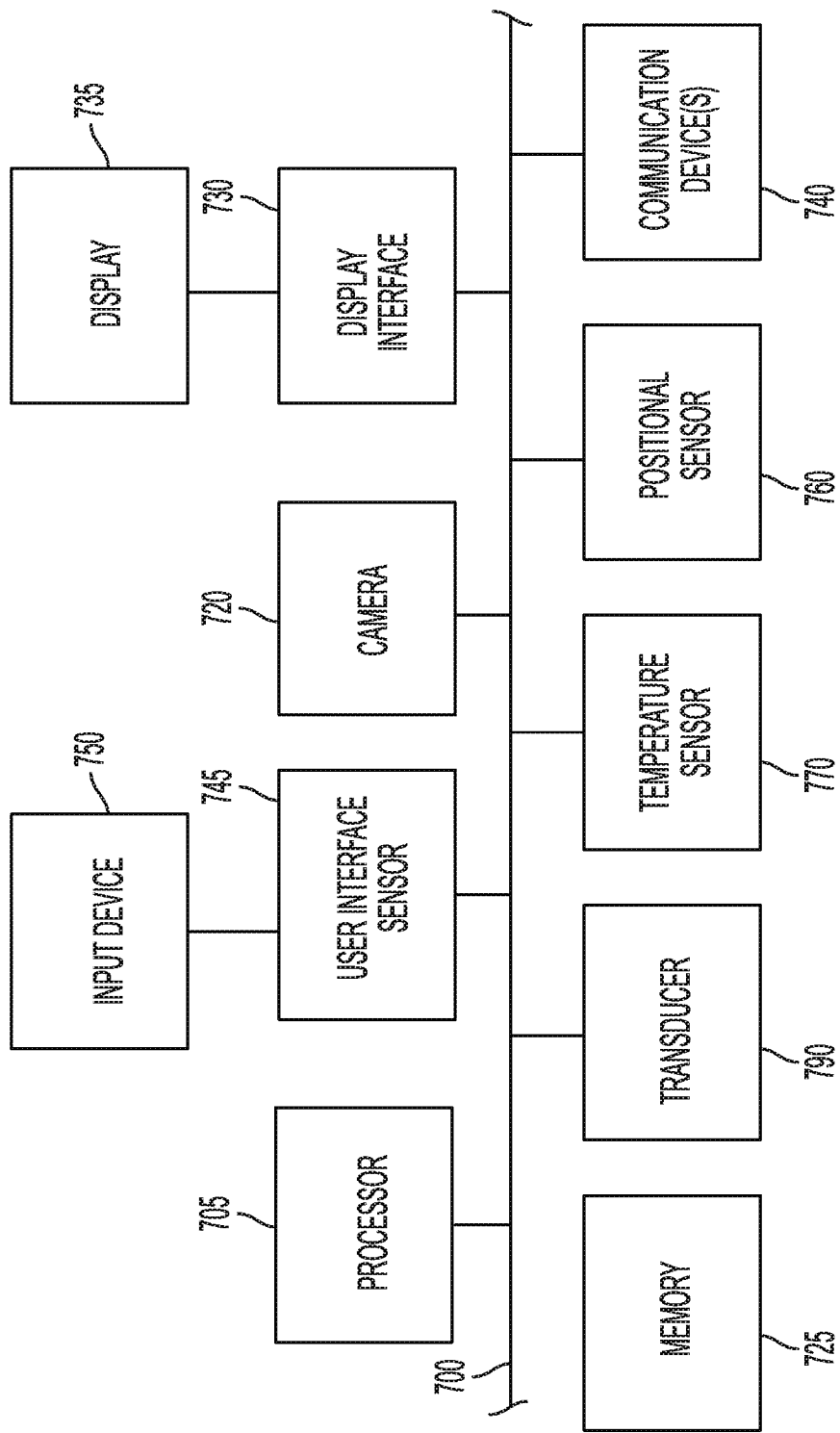
FIG. 7 illustrates example electronic components that may be used in various aspects.

FIG. 7 depicts an example of internal hardware that may be included in any of the electronic components of the system, such as the onboard hardware of the sonic sensor 10 of FIG. 2, or that of the computing device 72 or server 72 of FIG. 1. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored.

An optional display interface 730 may permit information from the bus 700 to be displayed on a display device 735 in visual, graphic or alphanumeric format. An audio interface and audio output (such as a speaker) also may be provided. Communication with external devices may occur using various communication devices 740 such as a wireless antenna, an RFID tag and/or short-range or near-field communication transceiver, each of which may optionally communicatively connect with other components of the device via one or more communication system. The communication device 740 may be configured to be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. Digital image frames also may be received from a camera 720 that can capture video and/or still images. The system also may include a positional sensor 780 such as a global positioning system (GPS) sensor device that receives positional data from an external GPS network. Various elements of the system (as installed in the sonic sensor) also may include a temperature sensor 780 and a transducer 790, as previously described in the context of FIG. 2 above.

In this document, the terms "electronic device," "computer" and "computing device" refer to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 7.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link.

"Electronic communication" refers to the transmission of data via one or more signals between two or more electronic devices, whether through a wired or wireless network, and whether directly or indirectly via one or more intermediary devices. Devices are "electronically connected" if a path for transmission of electronic signals exists between the two devices.

In this document, the term "connected," when referring to two physical structures and not used in the context of electronic or communicative connection, means that the two physical structures touch each other. Devices that are connected may be secured to each other, or they may simply touch each other and not be secured.

In this document, the term "fluid" has its common meaning as any substance that has no fixed shape and yields easily to external pressure. A fluid may be a liquid, a gas or a plasma. In addition, a fluid may contain some solids so long as the overall substance will flow in response to the application of force.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for monitoring processing of a fluid, the system comprising:
 a sensor for measuring one or more characteristics of a fluid when the fluid is in contact with the sensor; and
 a memory containing programming instructions that are configured to cause a processor to:
  use the one or more characteristics of the fluid to determine specific gravity of the fluid and a level of processing activity of the fluid, wherein the processing activity comprises fermentation, and
  cause a display device to output a user interface containing a dynamic representation of:
   the specific gravity of the fluid, as determined by the processing device based on the one or more characteristics, and
   the determined level of processing activity as determined by the processing device based on the one or more characteristics, wherein the dynamic representation of the determined level of processing activity comprises a fermentation tank with a dynamically changing cavity,
wherein displayed characteristics of the cavity will change as the determined level of the fermentation increases.

2. The system of claim 1, wherein the memory comprises additional programming instructions that are configured to cause the processor to:
use the determined level of fermentation to identify a remaining time for completion of fermentation of the fluid; and
cause the user interface to output a dynamic representation of the remaining time for completion of the fermentation of the fluid.

3. The system of claim 1, wherein:
the dynamic representation of the determined level of processing activity also comprises a dynamically changing status bar, and:
the status bar comprises a segment representing a processing activity level and a segment representing a period during which the fluid may remain in a tank in which the sensor is present after processing is complete.

4. The system of claim 1, further comprising programming instructions that are configured to cause the processing device to:
continue to determine the level of processing activity of the fluid over a period of time;
access a data set of previous processing activity for the fluid and identify, from the data set, an expected level of processing activity over the period of time;
assess whether the determined level of processing activity over the period of time deviates from the expected level of processing activity over the period of time; and
when the determined level of processing activity over the period of time deviates from the expected level of processing activity over the period of time, cause the display device to generate an output indicating such.

5. The system of claim 1, wherein:
the sensor comprises a sonic sensor;
the one or more characteristics of the fluid comprise a speed of sound within the fluid; and
the instructions to use the one or more characteristics of the fluid to determine the specific gravity of the fluid comprise instructions to use the speed of sound and a bulk modulus of the fluid to determine density of the fluid, and using the determined density of the fluid to determine the specific gravity of the fluid; and
the instructions to use the one or more characteristics of the fluid to determine a level of processing activity of the fluid comprise instructions to:
identify changes in the specific gravity of the fluid over a period of time, and
use the changes to determine the level of processing activity.

6. The system of claim 5, wherein:
the sensor comprises a transducer, a processor, and programming instructions that are configured to cause the processor to:
cause the transducer to generate and transmit signals toward a reflective surface,
monitor signals reflected from the reflective surface when received by the transducer, and
use a time of generation of the generated signals and a time of receipt the received signals to measure the speed of sound in the fluid.

7. The system of claim 5, wherein:
the memory comprises additional programming instructions that are configured to cause the processor to use the specific gravity to determine a level of fermentation of the fluid; and
the dynamic representation of the determined level of processing activity comprises a fermentation tank with a dynamically changing cavity, wherein displayed characteristics of the cavity will change as the determined level of the fermentation increases.

8. The system of claim 1, wherein:
the sensor comprises a sonic sensor;
the one or more characteristics of the fluid comprise a speed of sound within the fluid; and
the instructions to use the one or more characteristics of the fluid to determine specific gravity of the fluid comprise instructions to:
use the speed of sound of the fluid to determine density of the fluid, and
determine the specific gravity of the fluid based on the speed of sound and a bulk modulus of the fluid;
the system further comprises instructions to use the specific gravity to determine API gravity of the fluid; and
the instructions to cause the display device to output the user interface containing the dynamic representation of the specific gravity of the fluid comprise instructions to display the determined API gravity of the fluid.

9. A method of monitoring processing activity of a fluid, the method comprising:
by a sensor, measuring one or more characteristics of a fluid that is in contact with the sensor; and
by a processor, executing programming instructions that are configured to cause the processor to:
use the one or more characteristics of the fluid to determine specific gravity of the fluid and a level of processing activity of the fluid, wherein the processing activity comprises fermentation, and
cause a display device to output a dynamic representation of:
the specific gravity of the fluid, as determined by the processing device based on the one or more characteristics, and
a fermentation tank with a dynamically changing cavity in which displayed characteristics of the cavity will change as the determined level of the fermentation increases as determined by the processing device based on the one or more characteristics.

10. The method of claim 9 further comprising, by the processor:
using the determined level of fermentation to identify a remaining time for completion of fermentation of the fluid; and
causing the display device to output a dynamic representation of the remaining time for completion of the fermentation of the fluid.

11. The method of claim 9, wherein:
causing the display device to output the dynamic representation of the determined level of processing activity comprises causing the display device to display a dynamically changing status bar; and
the status bar comprises a segment representing a processing activity level and a segment representing a period during which the fluid may remain in a tank in which the sensor is present after processing is complete.

12. The method of claim 9 further comprising, by the processor:
   continuing to determine the level of processing activity of the fluid over a period of time;
   accessing a data set of previous processing activity for the fluid and identify, from the data set, an expected level of processing activity over the period of time;
   assessing whether the determined level of processing activity over the period of time deviates from the expected level of processing activity over the period of time; and
   when the determined level of processing activity over the period of time deviates from the expected level of processing activity over the period of time, causing the display device to generate an output indicating such.

13. The method of claim 9, wherein:
   the sensor comprises a sonic sensor;
   the one or more characteristics of the fluid comprise a speed of sound within the fluid;
   using the one or more characteristics of the fluid to determine the specific gravity of the fluid comprises using the speed of sound and a bulk modulus of the fluid to determine density of the fluid, and using the determined density to determine the specific gravity of the fluid; and
   using the one or more characteristics of the fluid to determine a level of processing activity of the fluid comprises identifying changes in the specific gravity of the fluid over a period of time and using the changes to determine the level of processing activity.

14. The method of claim 13, wherein:
   the sensor comprises a transducer; and
   the method further comprises:
      causing the transducer to generate and transmit signals toward a reflective surface,
      monitoring signals reflected from the reflective surface when received by the transducer, and
      using a time of transmission of the generated signals and a time of receipt of the received signals to measure the speed of sound in the fluid.

15. The method of claim 13, further comprising, by the processor:
   using the specific gravity to determine a level of fermentation of the fluid; and
   wherein causing the display device to output the dynamic representation of the determined level of processing activity comprises causing the display device to display a fermentation tank with a dynamically changing cavity in which displayed characteristics of the cavity change as the determined level of the fermentation increases.

16. The method of claim 9, wherein:
   the sensor comprises a sonic sensor;
   the one or more characteristics of the fluid comprise a speed of sound within the fluid; and
   determining the specific gravity of the fluid comprises:
      using the speed of sound of the fluid to determine density of the fluid, and
      determining the specific gravity of the fluid based on the speed of sound and a bulk modulus of the fluid;
   the method further comprises using the specific gravity to determine API gravity of the fluid; and
   causing the display device to output the dynamic representation of the specific gravity of the fluid comprises causing the display device to display the determined API gravity of the fluid.

17. A system for monitoring processing of a fluid, the system comprising:
   a sonic sensor for measuring speed of sound in a fluid when the fluid in contact with the sensor; and
   a memory containing programming instructions that are configured to cause a processing device to:
      use the speed of sound of the fluid and a bulk modulus for the fluid to determine density of the fluid,
      using the determined density to determine specific gravity of the fluid,
      use the determined specific gravity to determine a level of processing activity of the fluid by identifying changes in the specific gravity of the fluid over a period of time and using the changes to determine the level of processing activity, and
      cause a display device to output a dynamic representation of the determined level of processing activity as determined by the processing device based on the speed of sound.

18. The system of claim 17, wherein:
   the processing activity comprises fermentation; and
   the dynamic representation of the determined level of processing activity comprises a fermentation tank with a dynamically changing cavity, wherein displayed characteristics of the cavity will change as the determined level of the fermentation increases.

19. A system for monitoring processing of a fluid, the system comprising:
   a sonic sensor for measuring one or more characteristics of a fluid when the fluid is in contact with the sonic sensor; and
   a memory containing programming instructions that are configured to cause a processor to:
      use the one or more characteristics of the fluid to determine specific gravity of the fluid and a level of processing activity of the fluid, wherein:
         the one or more characteristics of the fluid comprise a speed of sound within the fluid,
         the instructions to use the one or more characteristics of the fluid to determine the specific gravity of the fluid comprise instructions to use the speed of sound and a bulk modulus of the fluid to determine density of the fluid, and using the determined density of the fluid to determine the specific gravity of the fluid, and
         the instructions to use the one or more characteristics of the fluid to determine a level of processing activity of the fluid comprise instructions to identify changes in the specific gravity of the fluid over a period of time and use the changes to determine the level of processing activity, and
      cause a display device to output a user interface containing a dynamic representation of:
         the specific gravity of the fluid, as determined by the processing device based on the one or more characteristics, and
         the determined level of processing activity as determined by the processing device based on the one or more characteristics.

20. The system of claim 19, wherein the memory comprises additional programming instructions that are configured to cause the processor to:

use the determined level of fermentation to identify a remaining time for completion of fermentation of the fluid; and cause the user interface to output a dynamic representation of the remaining time for completion of the fermentation of the fluid.

21. The system of claim 19, wherein:

the dynamic representation of the determined level of processing activity comprises a dynamically changing status bar, and:

the status bar comprises a segment representing a processing activity level and a segment representing a period during which the fluid may remain in a tank in which the sensor is present after processing is complete.

22. The system of claim 19, further comprising programming instructions that are configured to cause the processing device to:

continue to determine the level of processing activity of the fluid over a period of time;

access a data set of previous processing activity for the fluid and identify, from the data set, an expected level of processing activity over the period of time;

assess whether the determined level of processing activity over the period of time deviates from the expected level of processing activity over the period of time; and when the determined level of processing activity over the period of time deviates from the expected level of processing activity over the period of time, cause the display device to generate an output indicating such.

23. The system of claim 19, wherein:

the sensor comprises a transducer, a processor, and programming instructions that are configured to cause the processor to:

cause the transducer to generate and transmit signals toward a reflective surface, monitor signals reflected from the reflective surface when received by the transducer, and use a time of generation of the generated signals and a time of receipt the received signals to measure the speed of sound in the fluid.

24. The system of claim 19, wherein:

the memory comprises additional programming instructions that are configured to cause the processor to use the specific gravity to determine a level of fermentation of the fluid; and the dynamic representation of the determined level of processing activity comprises a fermentation tank with a dynamically changing cavity, wherein displayed characteristics of the cavity will change as the determined level of the fermentation increases.

25. A system for monitoring processing of a fluid, the system comprising:

a sonic sensor for measuring one or more characteristics of a fluid when the fluid is in contact with the sonic sensor, wherein the one or more characteristics of the fluid comprise a speed of sound within the fluid; and a memory containing programming instructions that are configured to cause a processor to:

use the one or more characteristics of the fluid to determine specific gravity of the fluid and a level of processing activity of the fluid, wherein the instructions to use the one or more characteristics of the fluid to determine the specific gravity of the fluid comprise instructions to use the speed of sound to determine density of the fluid and determine the specific gravity of the fluid based on the speed of sound and a bulk modulus of the fluid, use the specific gravity to determine API gravity of the fluid, and cause a display device to output a user interface containing a dynamic representation of:

the determined API gravity of the fluid, and the determined level of processing activity as determined by the processing device based on the one or more characteristics.

26. The system of claim 25, wherein the memory comprises additional programming instructions that are configured to cause the processor to:

use the determined level of fermentation to identify a remaining time for completion of fermentation of the fluid; and cause the user interface to output a dynamic representation of the remaining time for completion of the fermentation of the fluid.

27. The system of claim 25, wherein:

the dynamic representation of the determined level of processing activity also comprises a dynamically changing status bar, and:

the status bar comprises a segment representing a processing activity level and a segment representing a period during which the fluid may remain in a tank in which the sensor is present after processing is complete.

28. The system of claim 25, further comprising programming instructions that are configured to cause the processing device to:

continue to determine the level of processing activity of the fluid over a period of time;

access a data set of previous processing activity for the fluid and identify, from the data set, an expected level of processing activity over the period of time;

assess whether the determined level of processing activity over the period of time deviates from the expected level of processing activity over the period of time; and when the determined level of processing activity over the period of time deviates from the expected level of processing activity over the period of time, cause the display device to generate an output indicating such.

29. A method of monitoring processing activity of a fluid, the method comprising:

by a sensor, measuring one or more characteristics of a fluid that is in contact with the sensor; and by a processor, executing programming instructions that are configured to cause the processor to:

use the one or more characteristics of the fluid to determine specific gravity of the fluid and a level of processing activity of the fluid, use the determined level of fermentation to identify a remaining time for completion of fermentation of the fluid, and cause a display device to output a dynamic representation of:

the specific gravity of the fluid, as determined by the processing device based on the one or more characteristics, the determined level of processing activity as determined by the processing device based on the one or more characteristics, and the remaining time for completion of the processing activity of the fluid.

30. The method of claim 29, wherein:
causing the display device to output the dynamic representation of the determined level of processing activity comprises causing the display device to display a dynamically changing status bar; and
the status bar comprises a segment representing a processing activity level and a segment representing a period during which the fluid may remain in a tank in which the sensor is present after processing is complete.

31. The method of claim 29 further comprising, by the processor:
continuing to determine the level of processing activity of the fluid over a period of time; accessing a data set of previous processing activity for the fluid and identify, from the data set, an expected level of processing activity over the period of time;
assessing whether the determined level of processing activity over the period of time deviates from the expected level of processing activity over the period of time; and
when the determined level of processing activity over the period of time deviates from the expected level of processing activity over the period of time, causing the display device to generate an output indicating such.

32. The method of claim 29, wherein:
the sensor comprises a sonic sensor;
the one or more characteristics of the fluid comprise a speed of sound within the fluid;
using the one or more characteristics of the fluid to determine the specific gravity of the fluid comprises using the speed of sound and a bulk modulus of the fluid to determine density of the fluid, and using the determined density to determine the specific gravity of the fluid; and
using the one or more characteristics of the fluid to determine a level of processing activity of the fluid comprises identifying changes in the specific gravity of the fluid over a period of time and using the changes to determine the level of processing activity.

33. The method of claim 32, wherein:
the sensor comprises a transducer; and
the method further comprises:
causing the transducer to generate and transmit signals toward a reflective surface,
monitoring signals reflected from the reflective surface when received by the transducer, and
using a time of transmission of the generated signals and a time of receipt of the received signals to measure the speed of sound in the fluid.

34. The method of claim 32, further comprising, by the processor:
using the specific gravity to determine a level of fermentation of the fluid; and
wherein causing the display device to output the dynamic representation of the determined level of processing activity comprises causing the display device to display a fermentation tank with a dynamically changing cavity in which displayed characteristics of the cavity change as the determined level of the fermentation increases.

35. The method of claim 29, wherein:
the sensor comprises a sonic sensor;
the one or more characteristics of the fluid comprise a speed of sound within the fluid; and
determining the specific gravity of the fluid comprises:
using the speed of sound of the fluid to determine density of the fluid, and
determining the specific gravity of the fluid based on the speed of sound and a bulk modulus of the fluid;
the method further comprises:
using the specific gravity to determine API gravity of the fluid, and
causing the display device to output the dynamic representation of the specific gravity of the fluid comprises causing the display device to display the determined API gravity of the fluid.

36. A method of monitoring processing activity of a fluid, the method comprising:
by a sonic sensor, measuring one or more characteristics of a fluid that is in contact with the sensor, wherein the one or more characteristics comprise a speed of sound within the fluid; and
by a processor, executing programming instructions that are configured to cause the processor to:
use the speed of sound and a bulk modulus of the fluid to determine a density of the fluid,
use the density to determine specific gravity of the fluid,
identify changes in the specific gravity of the fluid over a period of time, and
using the changes to determine a level of processing activity of the fluid, and
cause a display device to output a dynamic representation of:
the specific gravity of the fluid, as determined by the processing device based on the one or more characteristics, and
the determined level of processing activity as determined by the processing device based on the one or more characteristics.

37. The method of claim 36, wherein:
causing the display device to output the dynamic representation of the determined level of processing activity comprises causing the display device to display a dynamically changing status bar; and
the status bar comprises a segment representing a processing activity level and a segment representing a period during which the fluid may remain in a tank in which the sensor is present after processing is complete.

38. The method of claim 36 further comprising, by the processor:
continuing to determine the level of processing activity of the fluid over a period of time;
accessing a data set of previous processing activity for the fluid and identify, from the data set, an expected level of processing activity over the period of time;
assessing whether the determined level of processing activity over the period of time deviates from the expected level of processing activity over the period of time; and
when the determined level of processing activity over the period of time deviates from the expected level of processing activity over the period of time, causing the display device to generate an output indicating such.

39. The method of claim 36, wherein:
the sensor comprises a transducer; and
the method further comprises:
causing the transducer to generate and transmit signals toward a reflective surface,
monitoring signals reflected from the reflective surface when received by the transducer, and using a time of transmission of the generated signals and a time of receipt of the received signals to measure the speed of sound in the fluid.

40. The method of claim 36, further comprising, by the processor:
using the specific gravity to determine a level of fermentation of the fluid; and
wherein causing the display device to output the dynamic representation of the determined level of processing activity comprises causing the display device to display a fermentation tank with a dynamically changing cavity in which displayed characteristics of the cavity change as the determined level of the fermentation increases.

41. A method of monitoring processing activity of a fluid, the method comprising:
by a sonic sensor, measuring one or more characteristics of a fluid that is in contact with the sensor, wherein the one or more characteristics comprise a speed of sound within the fluid; and
by a processor, executing programming instructions that are configured to cause the processor to:
use the one or more characteristics of the fluid to determine specific gravity of the fluid and a level of processing activity of the fluid, wherein determining the specific gravity of the fluid comprises using the speed of sound of the fluid to determine density of the fluid and determining the specific gravity of the fluid based on the speed of sound and a bulk modulus of the fluid,
use the specific gravity to determine API gravity of the fluid, and
cause a display device to output a dynamic representation of:
the specific gravity of the fluid, as determined by the processing device based on the one or more characteristics,
the determined API gravity of the fluid, and
the determined level of processing activity as determined by the processing device based on the one or more characteristics.

42. The method of claim 41, wherein:
causing the display device to output the dynamic representation of the determined level of processing activity comprises causing the display device to display a dynamically changing status bar; and
the status bar comprises a segment representing a processing activity level and a segment representing a period during which the fluid may remain in a tank in which the sensor is present after processing is complete.

43. The method of claim 41 further comprising, by the processor:
continuing to determine the level of processing activity of the fluid over a period of time;
accessing a data set of previous processing activity for the fluid and identify, from the data set, an expected level of processing activity over the period of time;
assessing whether the determined level of processing activity over the period of time deviates from the expected level of processing activity over the period of time; and
when the determined level of processing activity over the period of time deviates from the expected level of processing activity over the period of time, causing the display device to generate an output indicating such.

44. The method of claim 41, wherein:
the sensor comprises a transducer; and
the method further comprises:
causing the transducer to generate and transmit signals toward a reflective surface,
monitoring signals reflected from the reflective surface when received by the transducer, and
using a time of transmission of the generated signals and a time of receipt of the received signals to measure the speed of sound in the fluid.

* * * * *